United States Patent
Paolotti

(10) Patent No.: US 7,543,894 B2
(45) Date of Patent: Jun. 9, 2009

(54) FLANGED HUB FOR THE WHEEL OF A MOTOR VEHICLE

(75) Inventor: Massimo Paolotti, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 102 days.

(21) Appl. No.: 11/607,664

(22) Filed: Dec. 1, 2006

(65) Prior Publication Data
US 2007/0152498 A1    Jul. 5, 2007

(30) Foreign Application Priority Data
Dec. 2, 2005    (EP)    ................................. 05111650

(51) Int. Cl.
*B60B 27/00*    (2006.01)
(52) U.S. Cl. ................. 301/105.1; 301/35.627
(58) Field of Classification Search .............. 301/105.1, 301/35.621, 35.627, 35.63; 384/544
See application file for complete search history.

(56) References Cited

U.S. PATENT DOCUMENTS

| | | | |
|---|---|---|---|
| 4,887,917 A | | 12/1989 | Troster et al. |
| 5,386,630 A | * | 2/1995 | Fox ........................... 29/898.09 |
| 5,757,084 A | * | 5/1998 | Wagner ..................... 301/105.1 |
| 5,984,422 A | * | 11/1999 | Seifert ....................... 301/105.1 |
| 5,992,943 A | * | 11/1999 | Sheets et al. .............. 301/105.1 |
| 5,997,103 A | * | 12/1999 | Wagner ..................... 301/105.1 |
| 6,089,673 A | * | 7/2000 | Wiacek et al. ............ 301/105.1 |
| 6,149,244 A | * | 11/2000 | Wagner ..................... 301/105.1 |
| 6,227,624 B1 | * | 5/2001 | Wiacek et al. ............ 301/105.1 |
| 6,296,321 B1 | | 10/2001 | Mizukoshi et al. |
| 6,533,363 B1 | * | 3/2003 | Hayes et al. .............. 301/105.1 |
| 2004/0108849 A1 | | 6/2004 | Muramatsu et al. |

FOREIGN PATENT DOCUMENTS

EP    1 288 021 A2    3/2003

* cited by examiner

*Primary Examiner*—Russell D Stormer
*Assistant Examiner*—Kip T Kotter
(74) *Attorney, Agent, or Firm*—Merchant & Gould P.C.

(57) ABSTRACT

A rotatable flanged hub for the wheel of a motor vehicle forms, in a single piece:
  a cylindrical central part adapted for being coupled to a bearing unit;
  a flange extending in a radially outer direction starting from an end of the cylindrical part;
  a tubular appendix projecting from the axially outer side of the hub beyond the flange and joined to the central part by means of a root portion; and
  a cylindrical inner cavity defined by an inner cylindrical surface of the appendix and a radial surface of an axially outer end of the central part.

A circumferential groove extends into the root portion starting from the cylindrical inner cavity in order to increase flexibility of the tubular appendix with respect to the central part of the hub.

9 Claims, 2 Drawing Sheets

FLANGED HUB FOR THE WHEEL OF A MOTOR VEHICLE

BACKGROUND OF THE INVENTION

The present invention refers to a flanged hub for a motor vehicle wheel.

With reference to FIG. 1, a flanged hub of conventional design for a wheel of a motor vehicle forms, in a single piece, a cylindrical central part 11 with which a bearing unit (not shown) is coupled, a radial flange 12 for fastening to a wheel (not shown), a tubular appendix 13 projecting from the axially outer side of the hub 10, and having an outer cylindrical surface 14 for centering the wheel. The wheel is steadily secured to the flange 12 by tightening fastening bolts inserted through axial bores 15 formed through the flange 12.

As the vehicle is travelling along a bend, the wheel tends to incline at an angle different from 90° with respect to the central axis of rotation x, consequently deflecting the flange 12 to which it is fixed.

Repeated oscillations of the flange on either side with respect to a geometrical plane perpendicular to the axis of rotation can create fatigue and therefore cracks resulting from repeated or cyclic bending stresses in the root portion 13a that joints the appendix 13 to the cylindrical part 11.

SUMMARY OF THE INVENTION

It is an object of the invention to provide a durable flanged hub, capable of overcoming the above-discussed drawback.

This object is accomplished, in accordance with the present invention, by a flanged hub as defined in claim 1. Preferred embodiments of the invention are defined in the dependent claims.

BRIEF DESCRIPTION OF THE DRAWINGS

A few preferred, but not limiting embodiments of the invention will now be described, reference being made to the accompanying drawings, in which.

DETAILED DESCRIPTION OF THE PREFERRED EMBODIMENT(S)

Figure 1:
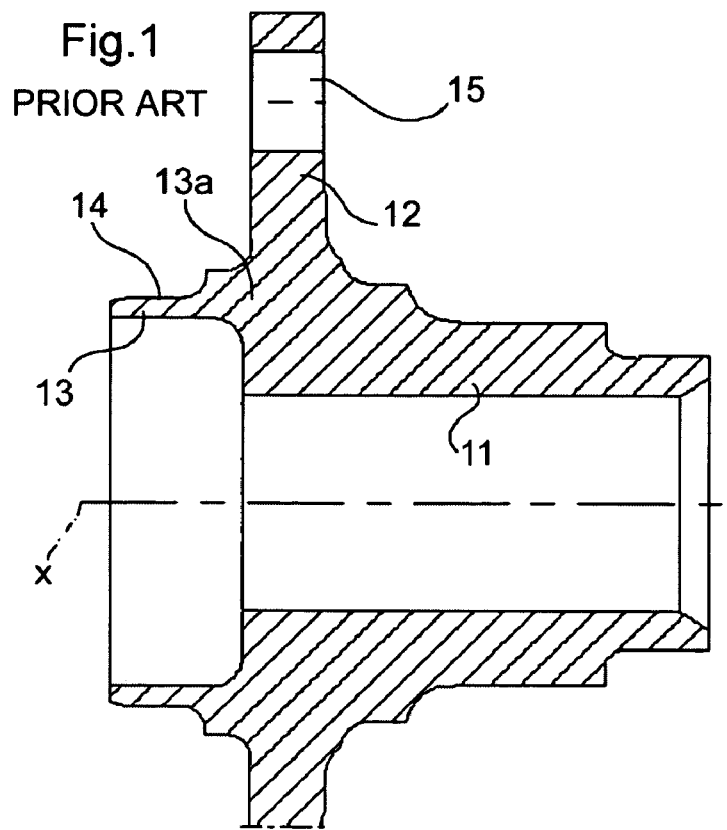
FIG. 1 is an axial cross-sectional view of a flanged hub of conventional design.
Figure 2:
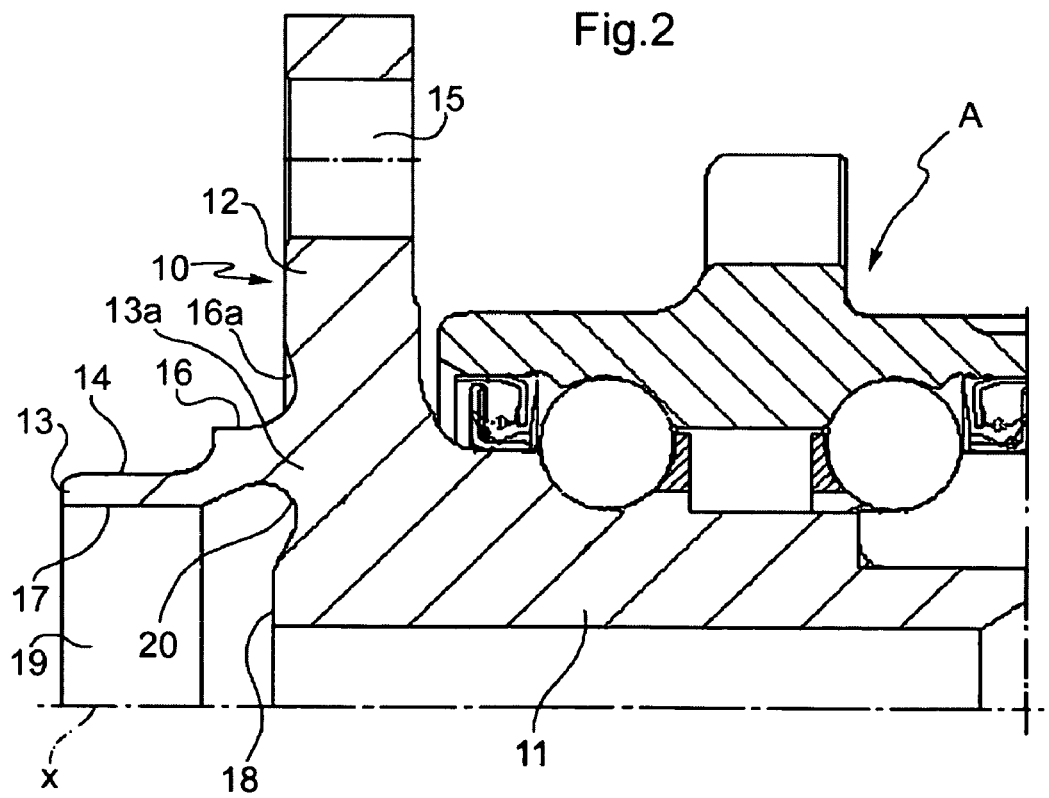
FIG. 2 is a partial, axial cross-sectional view of a first embodiment of a flanged hub according to the invention, associated with a bearing unit.

Referring now to FIG. 2, and using the same reference numeral already used for designating equal or corresponding parts discussed with reference to FIG. 1, a flanged hub 10 forms a central, cylindrical axial part 11, a radial flange 12, and a tubular appendix 13 axially aligned with the cylindrical part 11 and joined thereto by a root portion 13a. The appendix 13 projects in an axially outer direction beyond the flange 12. As used herein, the expressions "axially inner" and "axially outer" should be construed having regard to the mounted condition on a motor vehicle. Likewise, the expressions "radially inner" and "radially outer" are to be interpreted with respect to the axis of rotation x of the hub.

The central cylindrical part 11 is associated with a bearing unit indicated as a whole at A, and that, in the illustrated example, forms directly one of the radially inner raceways for the rolling elements of the bearing unit.

The flange 12 extends in a radially outer direction from the axially outer side of the cylindrical part 11, i.e. the side that in use is facing the outside of the vehicle (outboard side). Formed in the flange 12 are axial through bores 15 for receiving respective wheels fastening bolts (not shown).

The appendix 13 has a first cylindrical outer surface 14 for centering the wheel, and, in this example, a second cylindrical outer surface 16 for centering a brake rotor (not shown) that is locked together with the wheel on the hub by means of the same wheel fastening bolts. A conventional circumferential recess 16a, not deeper than a few tenths of a millimeter, is formed at the base of the flange 12 for favouring assembling of the brake rotor without weakening the flange.

The appendix 13 has an inner cylindrical surface 17 which, together with a radial surface 18 formed by the axially outer end of the central part 11, defines an inner cylindrical cavity 19.

According to the invention, the root portion 13a joining the appendix 13 to the central cylindrical part 11 is made thin by a circumferential groove 20 extending into the root portion 13a starting from the internal cavity 19, and more precisely from the zone where the inner cylindrical surface 17 meets the radial surface 18.

Whilst it is not desired to be bound to any specific theory in this connection, tests carried out by the Applicant show that, by making the root portion 13a thinner by means of the groove 20, the appendix 13 increases its ability to deflect in an axial plane with respect to the central part 11 of the hub, and therefore follow any elastic deviation of the flange 12 with respect to a plane perpendicular to the axis of rotation. In this way, bending stresses transmitted from the wheel to the flange 12 are taken up or withstood more elastically with time and without generation of fatigue as discussed in the introductory part of the description. Particularly, tests carried out by the Applicant show that excellent results can be achieved if, as shown in FIG. 2, the groove 20 extends into the root portion 13a in a substantially oblique direction, that is radially outwardly with respect to the cylindrical surface 17 and axially inwardly with respect to the radial surface 18. By way of indication, and according to the size of the hub, the groove 20 will extend both axially and radially for a depth of a few millimeters, (for example about 2 mm), measured starting from the intersection of surfaces 17 and 18.

Figure 3:
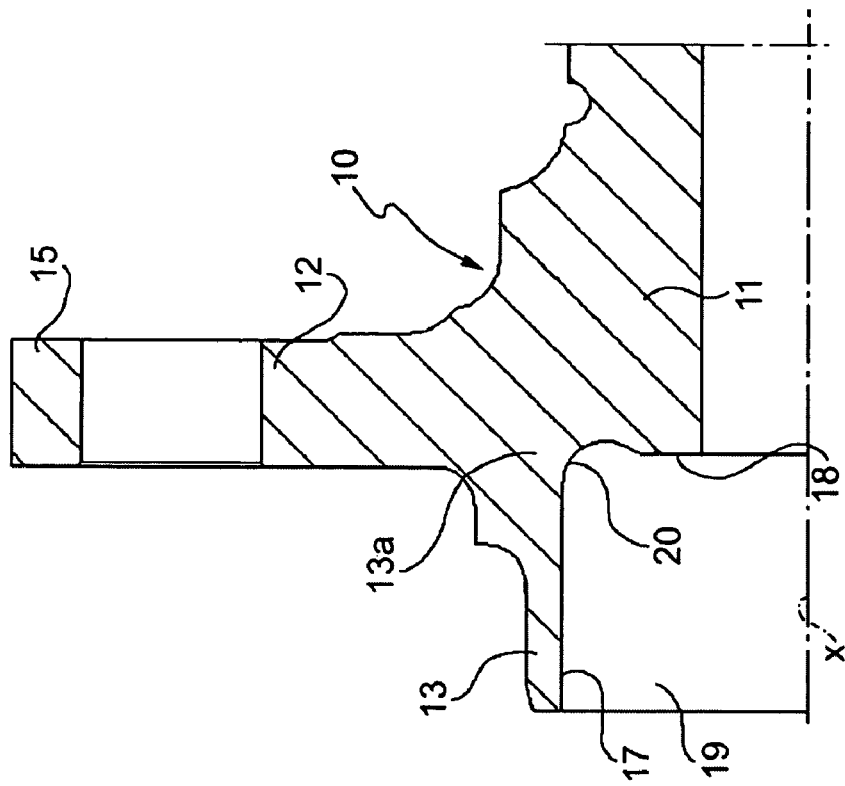
FIG. 3 is a partial, axial cross-sectional view of a second embodiment of the invention.
Figure 4:
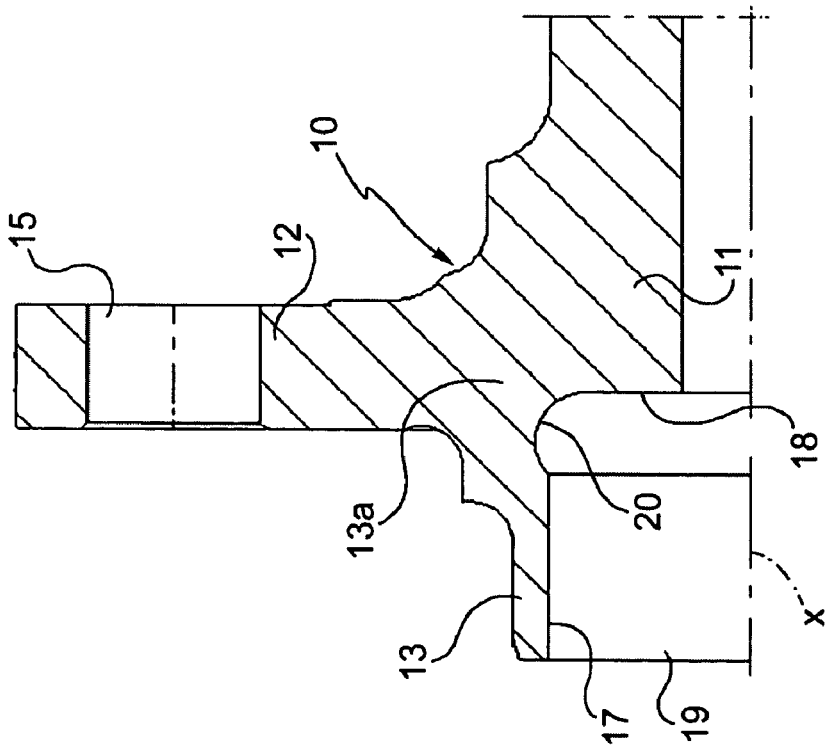
FIG. 4 is a partial, axial cross-sectional view of a third embodiment of the invention.

Possible variants are shown in FIGS. 3 and 4. In the exemplary embodiment of FIG. 3, the groove 20 extends in a radially outer direction only. In the embodiment of FIG. 4, the groove 20 extends in an axially inner direction only.

The invention is not intended to be limited to the embodiments described and illustrated herein, which should be considered only as the examples of embodiments of the hub. Rather, the invention may be modified with regard to the shape, size and arrangement of parts, constructional and functional details. For example, the hub may not form directly one of the raceways. In that case, the raceways will be formed by respective inner half-races of the bearing unit.

What is claimed is:

1. A rotatable flanged hub for the wheel of a motor vehicle, the hub forming in a single piece, comprising:
    a substantially cylindrical central part adapted for being coupled with a bearing unit,
    a flange extending in a radially outward direction from an axially outer end of the cylindrical part,
    a tubular appendix projecting from the axially outer side of the hub beyond the flange and joined to the central part by a root portion, an inner cylindrical cavity defined by an inner cylindrical surface of the appendix and a radial surface of an axially outer end of the central part;

wherein a circumferential groove extends into the root portion toward an axially inner end axially inward of the radial surface and radially outward starting from the inner cylindrical cavity for increasing flexibility of the tubular appendix with respect to the central part of the hub.

2. A hub according to claim 1, wherein the groove extends starting from a zone where the inner cylindrical surface of the appendix meets the radial surface.

3. A hub according to claim 1, wherein the groove extends into the root portion in a substantially oblique direction.

4. A hub according to claim 1, wherein the circumferential groove extends into the root portion at an oblique angle to a center axis of the appendix.

5. A hub according to claim 1, wherein the circumferential groove forms a section of decreased thickness of the root portion.

6. A rotatable flanged hub for the wheel of a motor vehicle, the hub forming in a single piece, comprising:

a substantially cylindrical central part having an outer bearing engaging surface adapted for being coupled with a bearing unit;

a flange extending in a radially outward direction from an axially outer end of the cylindrical part;

a tubular appendix projecting from the axially outer side of the hub beyond the flange and joined to the central part by a root portion;

an inner cylindrical cavity defined by an inner cylindrical surface of the appendix and a radial surface of an axially outer end of the central part;

wherein a circumferential groove extends into the root portion toward an axially inner end axially inward of the axially surface and radially outward toward the outer bearing surface starting from the inner cylindrical cavity for increasing flexibility of the tubular appendix with respect to the central part of the hub.

7. A hub according to claim 6, wherein the circumferential groove extends at an oblique angle to a center axis of the appendix.

8. A hub according to claim 7, wherein the circumferential groove forms a section of decreased thickness of the root portion.

9. A hub according to claim 6, wherein the circumferential groove forms a section of decreased thickness of the root portion.

* * * * *